United States Patent
Marchioro et al.

(10) Patent No.: US 6,688,352 B2
(45) Date of Patent: Feb. 10, 2004

(54) MULTI-AXIS WORK CENTER, FOR MULTIPLE PRODUCTION, IN PARTICULAR FOR WOOD WORKING

(75) Inventors: Sante Marchioro, Thiene (IT); Valentino Borriero, Thiene (IT)

(73) Assignee: Uniteam S.p.A., Thiene (IT)

( * ) Notice: Subject to any disclaimer, the term of this patent is extended or adjusted under 35 U.S.C. 154(b) by 0 days.

(21) Appl. No.: 10/114,604

(22) Filed: Apr. 2, 2002

(65) Prior Publication Data

US 2003/0026672 A1 Feb. 6, 2003

(30) Foreign Application Priority Data

Apr. 6, 2001 (IT) ..................... MI2001A0749
Jan. 22, 2002 (IT) ..................... MI2002A0099

(51) Int. Cl.⁷ .......................... B23Q 15/00; B27C 9/00; B27M 1/08
(52) U.S. Cl. .................. 144/382; 29/26 A; 29/33 J; 144/3.1; 144/48.1; 408/3; 408/34; 408/50; 409/158; 409/202; 409/217; 700/150; 700/159; 700/167
(58) Field of Search ............ 29/26 R, 26 A, 29/33 J, 35.5, 36, 563, 564; 144/3.2, 2.1, 48.1, 356, 382, 365; 408/3, 16, 43, 50, 34; 409/158, 164, 202, 203, 204, 172, 217; 700/95, 117, 150, 159, 167; 483/1, 13

(56) References Cited

U.S. PATENT DOCUMENTS

| | | | |
|---|---|---|---|
| 4,945,958 A | * | 8/1990 | Shoda .................. 144/48.1 |
| 5,107,910 A | * | 4/1992 | Sasaki .................. 144/48.1 |
| 5,203,061 A | * | 4/1993 | Hamada .................. 29/33 M |
| 5,252,011 A | * | 10/1993 | Corsi .................. 409/235 |
| 5,326,200 A | * | 7/1994 | Suzuki .................. 144/135.2 |
| 5,368,425 A | * | 11/1994 | Mills et al. .................. 409/235 |
| 5,944,643 A | * | 8/1999 | Koelblin et al. .................. 483/55 |

FOREIGN PATENT DOCUMENTS

| | | |
|---|---|---|
| DE | 195 18 965 A1 | 11/1996 |
| DE | 198 42 386 A1 | 3/1999 |
| WO | WO 01/17723 A1 | 3/2001 |

* cited by examiner

Primary Examiner—W. Donald Bray
(74) Attorney, Agent, or Firm—Notaro & Michalos P.C.

(57) ABSTRACT

The invention relates to a work center for wood working including:
  a support base (1) for the pieces to be worked;
  a structure (6), mobile along said base in the direction of a first numerically controlled axis (X);
  a support (12) of a tool group (13) mounted on said structure and mobile, under numeric control, along a second axis orthogonal the first two, wherein a second tool group (15) is provided, mounted on said support (12), said second tool group (15) being mobile between a first position in which it fits completely within said support (12) and a second position in which said second tool group protrudes from the said support (12).

According to a second preferred embodiment, the machine includes, mounted onto the same structure (6), a second carriage mobile along said second axis and supporting a second tool group mobile along said third axis (Z) orthogonal to the first two.

7 Claims, 5 Drawing Sheets

MULTI-AXIS WORK CENTER, FOR MULTIPLE PRODUCTION, IN PARTICULAR FOR WOOD WORKING

The invention proposes a multi-axis work centre, for multiple production, especially, but not exclusively, for wood working, including a base for the piece to be manufactured, a structure, mobile along this base according to a first numerically controlled axis, a pair of carriages mounted on said structure on opposite ends and mobile along a second numerically controlled axis, with the same number of "tool-groups" each of which mounted onto mobile supports, independently, along a third numerically controlled axis, orthogonal to the previous ones.

The term "tool-group" refers to a device upon which various tools can be mounted, for example, a chuck, or a tool holder head, in turn fitted with one or more degrees of freedom, preferably around rotation axes.

In compliance with a particular version preferred by the invention, a chuck and boring head with independent mandrels, mobile between a first position in which fits perfectly within the support and a second operative position, which juts out compared to the first, are mounted onto on one or both said supports mounted on the carriages.

According to the invention, in this way the machine allows for use of different groups of tools on a single structure and with a single control allowing for different productions to be carried out at the same time on the same piece, and allowing for the elimination of dead production times, for example, by programming the machine so that when a tool group stops to replace the tool, the other continues to work.

Preferably, the mobile structure along the base is a overhanging structure and the supports of the tool groups are made up of mobile carriages along said overhanging structure.

In the field of automatic tool machines, various types of machines used to carry out production through the removal of material are wellknown. Generally these machines include a support mobile along three Cartesian axes upon which an interchangeable tool is mounted which can be a pin drill, a milling cutter or similar.

Machines in which a chuck or a so-called "end effector" are mounted onto this support are also well-known, that is to say a further support of numerous tools aimed at carrying out various kinds of production, a support that is often mobile along one or more polar axes.

Machines which include a base upon which the piece to be manufactured are also well-known, for example from patent U.S. Pat. No. 5,252,011; a first mobile support along this base in the direction of a first axis, a second support mounted onto said first support and mobile along a second axis orthogonal to the previous one, and a tool holder structure mounted onto said support and mobile along a third axis, orthogonal to the first two.

A tool-holder head is mounted onto this structure fitted with one or more degrees of freedom.

Machines of this kind are well-known, used however in different fields from wood working, in particular in the manufacture of steel parts, for example, for the construction of moulds, or composite materials or similar.

In the wood working field these machines are not considered to be suitable as this is a field that often requires replacement of the tool-group to carry out different manufacturing processes, for example moving from milling operations to drilling operations or vice versa, with excessive machine standstill periods. For this reasons separate machines are normally used, but of a more simple and economic kind.

The present relates to this sector as it proposes a multi-functional multiple production work centre in particular for wood working which includes an overhanging structure mobile along a base upon which the piece to be manufactured is mounted, and a support or a pair of supports mounted on opposite ends of said overhanging structure and mobile along a second axis, on each of which a separate tool-group is mounted.

This allows for two different types of processes to be carried out, using the same machine after having replaced the tool group, or to continue work with one group while the tool is being replaced on the other.

According to a specific preferred version of the invention, on at least one of said second supports a boring head is mounted, said boring head being mobile between a position in which it is inserted within the support and an operative position in which it overhangs compared with the same, as well as a second device which may be a chuck or another well-known tool holder device.

The present invention is now described in detail, purely exemplifying and not restrictive, with reference to the attached drawings in which.

Figure 1:
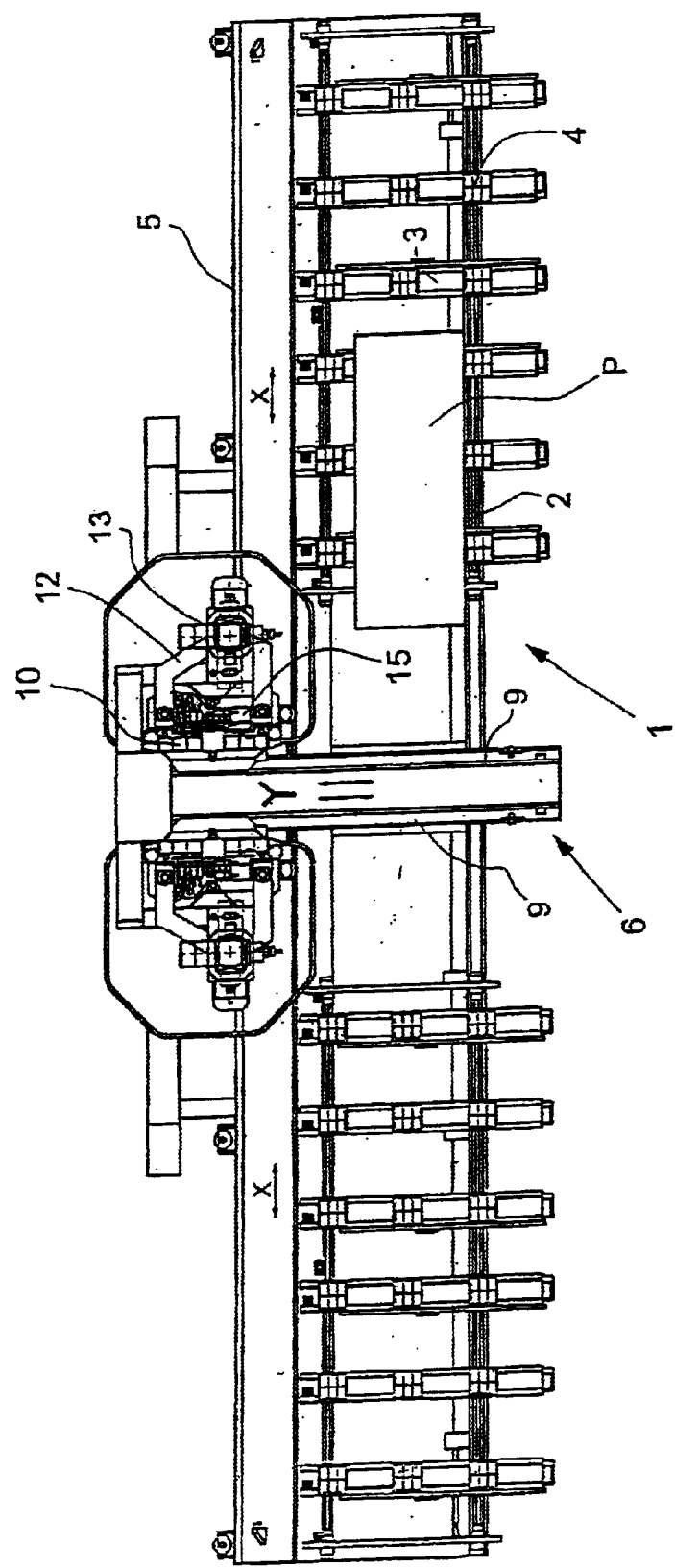
FIG. 1 illustrates, schematically, in the layout, a work centre according to the invention.
Figure 2:
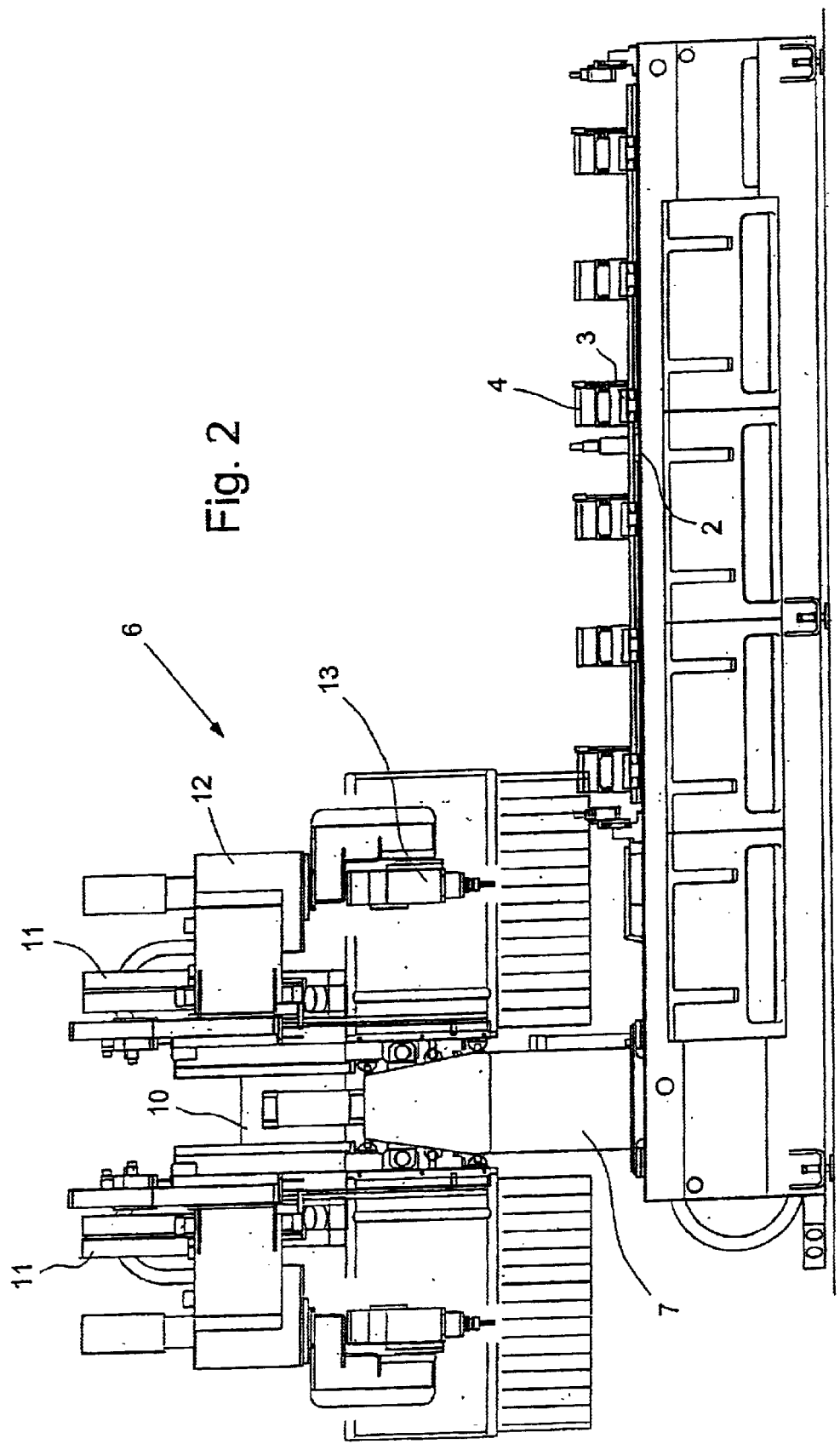
FIG. 2 is a front view, schematic of the machine according to the invention.
Figure 3:
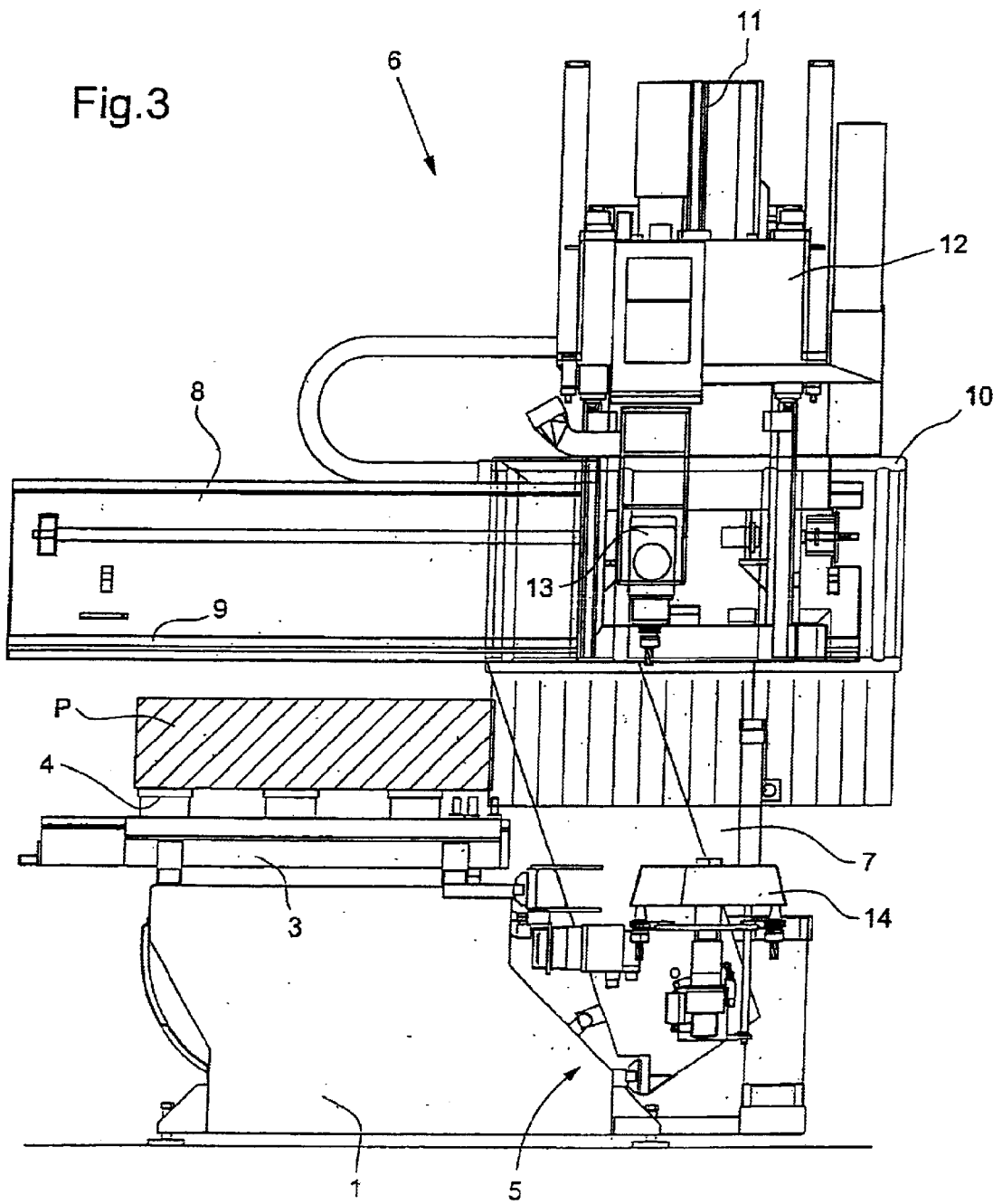
FIG. 3 illustrates the side view.
Figure 4:
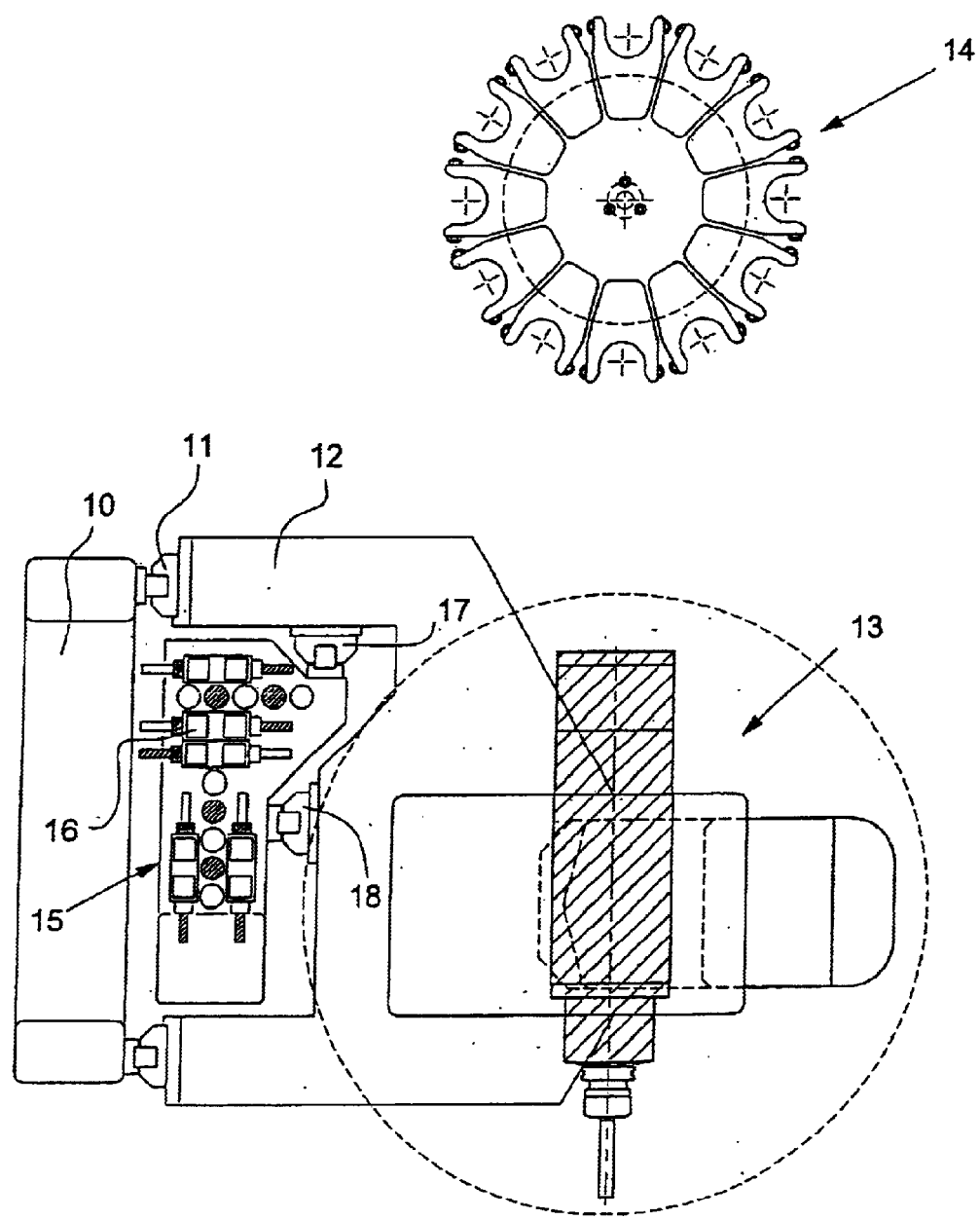
FIG. 4 is a view from the top of the support with the tool groups in a specific preferred version of the machine according to the invention.
Figure 6:
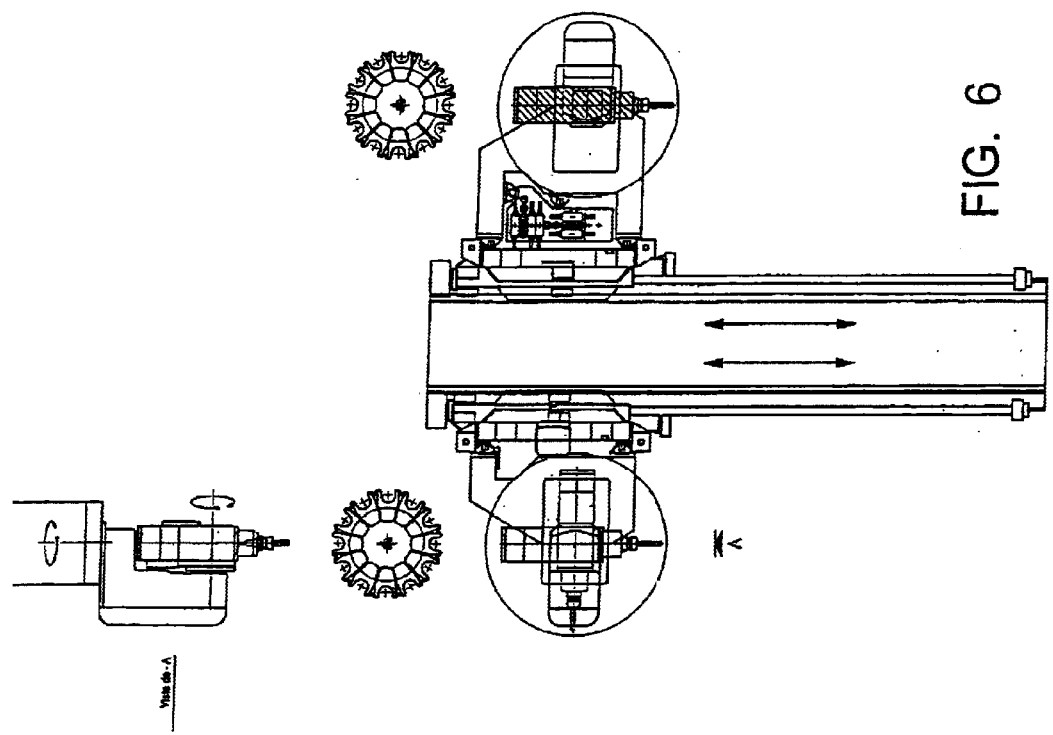
FIGS. 5 and 6 illustrate, schematically, a view from the top of the mobile support with the tool holder groups in the same number of preferred versions of the machine according to the invention.
Figure 5:
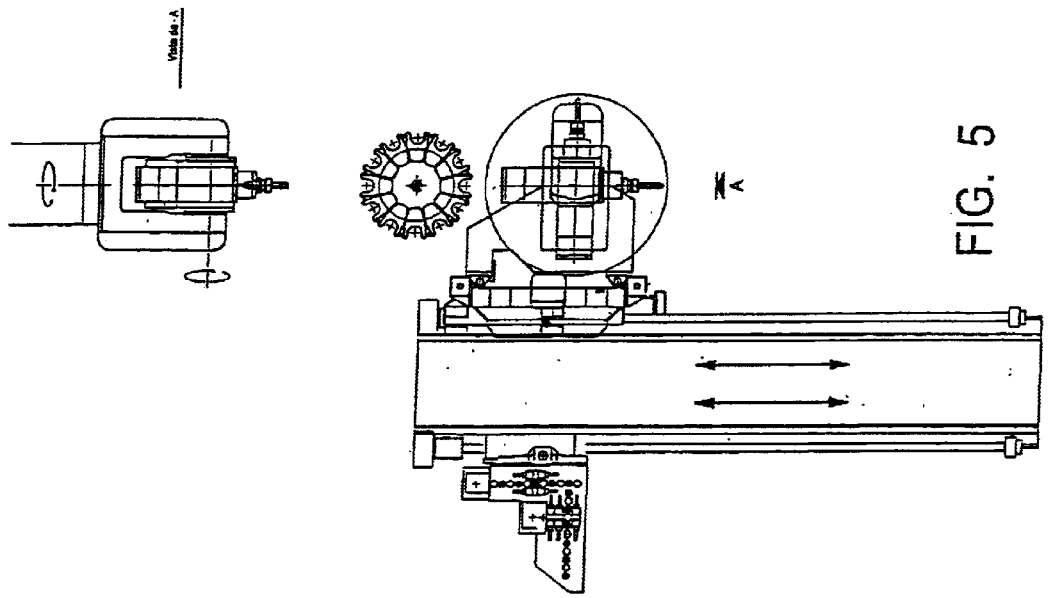

With reference to FIG. 1, the number 1 indicates, on the whole, the base of a work centre according to the invention upon which one or more pieces to be manufactured are placed, such as for example a panel indicated by "P".

The base includes a pair of slides 2 along which numerous crosspieces 3 can be positioned, each of which provided with a series of holding elements of the piece to be manufactured, which can in turn be positioned independently along the crosspieces 3.

For example these holding elements, indicated by number 4, can be pliers or suction supports or other well-known systems.

An example of these suction supports is illustrated in the patent request no. MI 2000U 000193 by the same applicant.

Along the base 1 a structure indicated generally as 6, preferably a structure including a support 7 with an overhanging beam 8, moves in the direction of the first numerically controlled axis X.

On a side of the beam 10 a pair of guides 9 are mounted, along which a carriage 10 can move.

According to a different preferred embodiment of the invention, two pairs of guides 9 along which support carriages 10 with the same number of tool groups, are provided on the beam 8, a pair for each side.

Movements of the structure 6 along the slides 5 (axis X) and the carriages 10 along the beam 8 (axis Y) are numerically controlled.

A pair of guides 11 are mounted onto each carriage 10, and along these guides a support 12 of a tool group 13 can move (axis Z), once again numerically controlled. This tool group may be a chuck 13 as illustrated in drawing 4, or a head to be drilled 14 as illustrated in drawing 5, or an operator head made up, for example, of an overhanging chuck mounted on an L support (drawing 6 on the left) or a fork (drawing 5 on the right).

These last configurations of tool groups do not require detailed descriptions, as they are already well-known.

Each structure 6 is associated to one or more tool holder warehouses, for example of a turntable kind like the one illustrated in drawing 4 and indicated with the number 14.

In the case of a single warehouse aimed at serving both tool groups, this will be favourably placed in correspondence to one extremity of the beam 8 while in the case of two warehouses the layout may be different, preferably at the sides of the support 7 (see drawing 3).

Now going back to drawings 1 to 4, each chuck 13 is mounted onto its own support with the possibility of movement around a pair of polar axes to allow for disposition of the tool with any inclination in space.

The tools, as already mentioned above, are automatically collected from the warehouse 14 at the end of each production cycle.

In compliance with a preferred version of the invention, a second tool group made up of a boring head, indicated on the whole by number 15 and fitted with numerous drilling tools 16, is mounted onto support 12.

The boring head 15 runs along a pair of slides 17 and 18 controlled, by example, by a pneumatic piston (not illustrated in the drawing) or by other well-known devices, to move between two positions defined by stop means not shown in the drawing, in order to move from a rest position in which it is completely within the support, so as not to obstruct other procedures, to an operative position in which it protrudes from the support itself.

Practically, the head to be perforated may take on two fixed positions compared with the support, with a position well-known to the machine control. In this way it will be possible to find out the exact position of the boring head.

Operation works in the following way.

The pieces to be manufactured are positioned on the work top 1, fixing them using the devices 4, which may be suction cups if panels are to be manufactured, or blocking devices or similar for the manufacture of different pieces.

According to the type of manufacture process just one piece may be placed on the work top, which will then undergo working by both tool groups mounted onto the machine, which will alternate in various operations with a group that replaces the tool while the other continues its work, therefore eliminating any time wasting of machines for tool replacements.

Alternatively, it may be possible to place two separate pieces on the work top, with the same distance between its two centres of the two motors, with the two tool groups that operate at the same time a group working on the first piece and the other group working on the second piece, for example to carry out the contemporaneous contouring of the two elements.

This system which includes two tool groups allows for remarkable flexibility of the machine, as well as substantial space saving and a remarkable reduction in production times.

According to the type of work to be carried out, the machine may be fitted with different types of tool, which may work together or separately according to the programme.

In the case of groups that include a chuck associated with a boring head, once the piece has been blocked on a work top the structure 6 moves along the axis X, the carriage 10 along the axis Y and, finally, the support 12 is lowered along axis Z until the tool reaches the right point.

Subsequently the chuck 13 is activated, controlled in interpolation around the rotation axes, to begin production.

During this stage the boring head 15 remains lifted, completely contained within the support 12.

In this way the chuck 13 may rotate freely and take on any position without the risk of interference with the tools of the head 15.

When it is necessary to carry out drilling, the chuck 13 is positioned with the axis orthogonal to axis Z, after which lowering of the boring head 15 is controlled.

At this point it is sufficient to activate the piston that operates movement of the head, to bring it in contact with the locator that blocks it into an operative position.

Having made careful note of the position of the head 15 it is possible to begin the drilling operations, with movements of the head that are carried out by numerical control, in compliance with movements of the support 12.

With regards to the same solution idea, different forms of execution may be provided for which may, however, be considered within the present findings.

In this way, for example, the structure 6 may be a portal structure instead of an overhanging structure, or the carriage 10 may be mounted fixed onto the structure and the movements along the axis Y achieved by moving the support top of the pieces to be manufactured in the same direction.

What is claimed is:

1. A work center for wood working comprising:

a support base for holding pieces being worked;

a structure, movable along the support base in the direction of a first axis, the structure being numerically controlled;

a pair of carriages each movable along the structure on a second axis orthogonal to the first, first and second tool groups, the first tool group being a boring head and the second tool group being a chuck movable in two polar axes; and a pair of supports, each support mounted to a corresponding one of the pair of carriages and movable, under numeric control, along a third axis, each of the pair of supports holding one of the first and second tool groups, at least one of the first and second tool groups being moveable between a first position in which the tool group is held completely within the corresponding support, and a second position in which the second tool group protrudes from the corresponding support.

2. A work center for woodworking according to claim 1, wherein the pair of carriages are mounted on opposite sides of the structure.

3. A work center for woodworking according to claim 1, further comprising a pair of limit switches provided on at least one of the pair of carriages, the limit switches establishing the position of the boring head relative to the one of the pair of carriages.

4. A work center for woodworking according to claim 1, further comprising pneumatic means for controlling the movements of the boring head.

5. A work center for woodworking according to claim 1, wherein the structure movable along the support base comprises an overhanging structure, the supports being movable along the overhanging structure.

6. A work center for woodworking according to claim 5, wherein the movements of the pair of carriages is numerically controlled.

7. A work center for woodworking according to claim 1, wherein the movements of the pair of carriages is numerically controlled.

* * * * *